July 28, 1959 R. U. BLASER ET AL 2,896,811
WELDED AND BOLTED CLOSURE FOR HIGH PRESSURE VESSEL
Filed Feb. 23, 1956
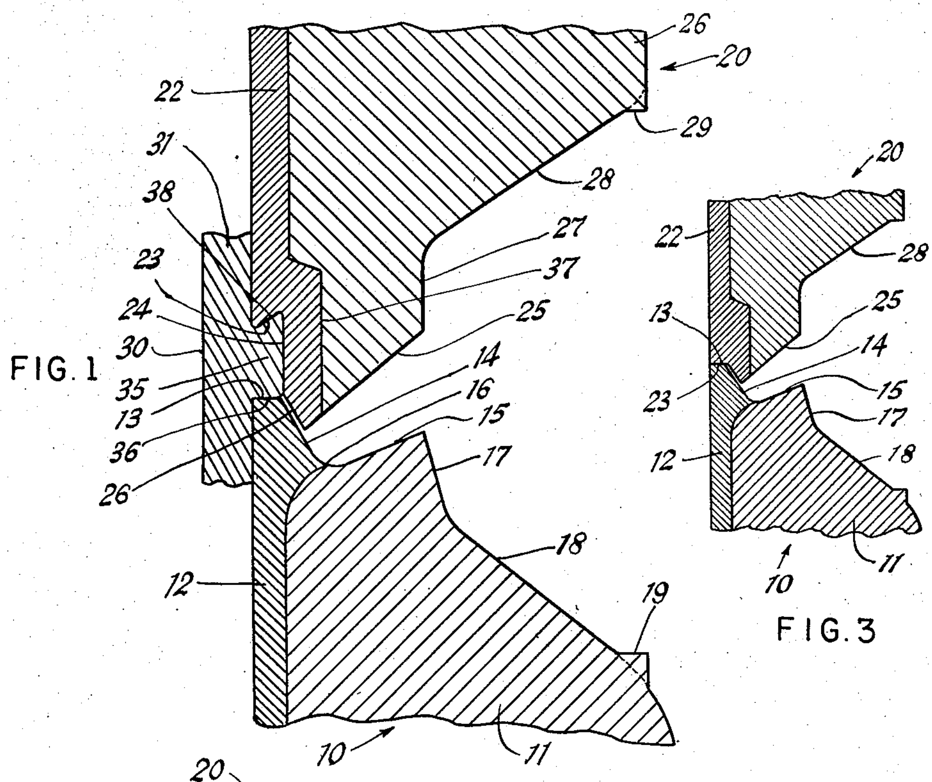
FIG. 1
FIG. 3
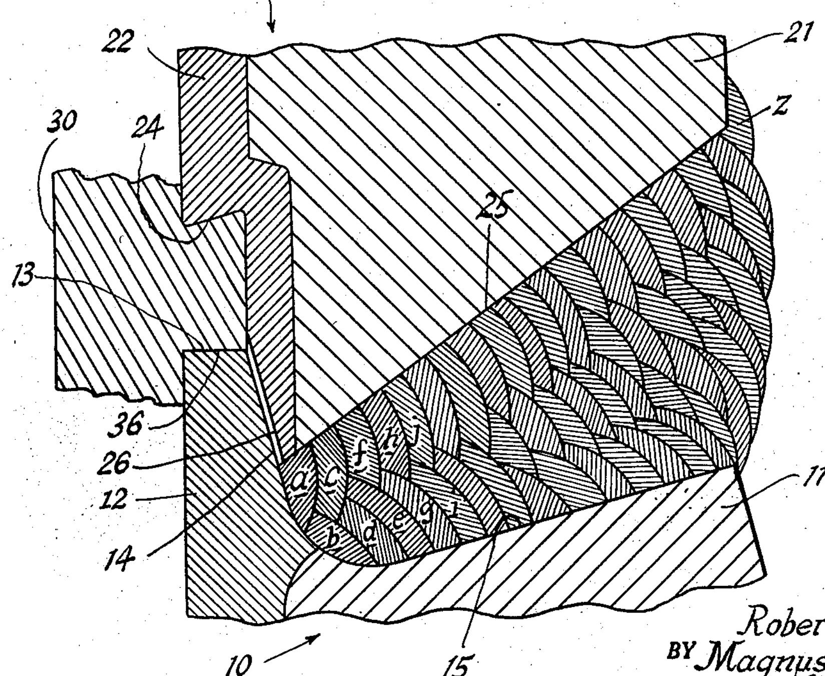
FIG. 2
INVENTORS
Robert U. Blaser
BY Magnus Christensen
ATTORNEY United States Patent Office 2,896,811
Patented July 28, 1959

2,896,811

WELDED AND BOLTED CLOSURE FOR HIGH PRESSURE VESSEL

Robert U. Blaser and Magnus Christensen, Alliance, Ohio, assignors to The Babcock & Wilcox Company, New York, N.Y., a corporation of New Jersey Application February 23, 1956, Serial No. 567,119

11 Claims. (Cl. 220—63)

This invention relates to pressure vessels and, more particularly, to a novel removable seal welded joint between an internally lined upright pressure vessel and an internally lined closure head therefor.

A typical pressure vessel to which the present invention is applicable comprises an upright cylindrical body formed of relatively thick high tensile strength carbon-silicon steel boiler or pressure vessel plates, this body having, on its inner surface, a relatively thinner lining of a substantially non-contaminating and non-contaminable stainless steel. The closure head is likewise formed of a relatively thick dome shaped body of the same material as the body of the pressure vessel and having, on its inner surface, a lining of the same material as the lining of the pressure vessel. For example, the steel of the body of the pressure vessel and of its closure may be that designated SA-212, and the interior lining may be an AISI Type 347 19Cr—9Ni—Cb alloy steel. SA-212 steel is a high tensile strength carbon-silicon steel used for plates for boilers and other pressure vessels, and has the following composition: C 0.28%–0.35%; Mn 0.90%; P 0.35%–0.04%; S 0.04%–0.05%; Si 0.15%–0.30%. The specifications for this steel are fully set forth on page 108 of "Material Specifications," Section II of the "ASME Boiler and Pressure Vessel Code," 1952 edition. When in use, the pressure vessel and its closure head are integrally united, to form a completely sealed and lined enclosure, by a generally circumferential seal weld between the upper end of the pressure vessel and the rim of the closure head. It is desirable that this seal weld be so disposed as to be removable, by machining, to open the pressure vessel for inspection and maintenance.

In accordance with the present invention, the upper end of the pressure vessel and the rim of the closure head are machined to cooperatively form a welding groove therearound when the vessel and head are assembled in proper relation. In some cases, a clamping ring may be interposed therebetween. The machining is carried into the stainless steel lining of the vessel and head so that the root of the welding groove is constituted by a surface of the lining. The welding groove is a blunt V-shape in cross-section, and extends downwardly and inwardly toward the interior of the vessel and head. For this purpose, an intermediate portion of the upper edge surface of the vessel is machined to form an upwardly and outwardly extending frusto-conical surface at an angle of the order of 15° to the horizontal, and a corresponding facing portion of the lower edge of the rim of the closure head is machined to form an upwardly and outwardly extending frusto-conical surface at an angle of the order of 30° to the horizontal. Thereby, the included angle of the welding groove is of the order of 15°, and the welding groove, by virtue of facing downwardly and inwardly, is adapted for easy deposition of welding metal thereinto. The narrowest width of the welding groove is made of sufficient extent so as to readily admit a machining tool thereinto for removing the seal weld without substantial impairment of the stainless steel lining at the root of the welding groove.

In order that any cracks developing in the weld metal deposited at the root of the welding groove will not propagate radially of the assembly, the vessel and its head are formed with mating frusto-conical surfaces extending upwardly from the upper edge of the root of the welding groove at a small angle to the axis of the vessel and its head. Thereby, any crack developing in the innermost welding bead or beads will propagate nearly axially of the assembly and not radially thereof.

At their inner surfaces, the vessel and head are formed with surfaces which mate with each other to maintain the aforementioned mating frusto-conical surfaces in closely adjacent, but slightly spaced parallel relation. When a clamping ring is to be interposed between the vessel and the head, the upper and lower edges of the clamping ring engaged with the head and the vessel are formed on a circumferential rib of the clamping ring arranged to extend the mating surfaces of the vessel and head, with the main body of the clamping ring, of considerably greater longitudinal or axial extent, lying against the inner surface of the vessel and its head.

At the exterior surface of the head, a series of machined pads are formed around its circumference each alignable longitudinally of the assembly with corresponding machined pads on the pressure vessel, these pads having facing horizontal surfaces. To assemble the head closure to the vessel, careful measurements are taken of the vertical distances between the surfaces of the machined pads, and necessary adjustments are performed to assure that the distances of the machined pads of the head and of the pressure vessel from each other at all points around the circumference are exactly equal. The clearance between the parallel spaced frusto-conical surfaces of the vessel and head is carefully measured at spaced points around the circumference to ascertain that there is a definite minimum clearance present at all points.

The welding groove forming portions of the vessel and head are then preheated, for example to 250° F. to 300° F. at a heating rate such as to avoid undue stresses, for example 20° F. per hour, and the minimum preheating temperature is maintained until the welding is completed. All of the welding electrodes are conditioned before use by baking at, for example 400° F, for not less than 2 hours. The weld is laid down in a plurality of beads. The first bead is deposited from a weld rod having substantially the same composition as the linings of the vessel and head, and this bead substantially closes the root of the welding groove, having at least a portion thereof in contact with the linings of the vessel and head. A second bead of extra low carbon, coated carbon steel electrode material is then deposited on the vessel and contiguous to the bottom portion of the first bead. A third bead of weld material of the same composition as that of the linings is then deposited to partly overlie the second bead, in engagement with the head and completely covering the balance of the first bead. Following the third bead, fourth and fifth beads of the extra low carbon steel electrodes are then deposited on top of each other, covering the second bead and in engagement with the pressure vessel. A sixth bead is then deposited from the extra low carbon, low hydrogen coating, steel electrodes to cover the exposed portion of the third bead and in contact with the fifth bead and with the head. The balance of the weld groove is then welded with a large number of beads of high tensile strength, low hydrogen coating, carbon steel electrodes deposited in a pre-determined sequence and finished in such a manner as to extend beyond the outer boundaries of the welding groove from machining and finishing.

In forming the seal weld, two or more welds are formed simultaneously, for each bead, at equi-spaced points around the circumference during deposit of the initial beads. Each bead, after it has been deposited, is cleaned by chipping and grinding. After the weld is completed to a pre-determined small depth of weld metal, the following beads are deposited in complete circumferential runs with new beads following each other at equally spaced points around the circumference.

For an understanding of the invention principle, reference is made to the following description of a typical embodiment thereof as illustrated in the accompanying drawing. In the drawing:

Fig. 1 is a partial axial sectional view of a pressure vessel, closure head and clamping ring as arranged prior to the welding operation;

Fig. 2 is a similar view illustrating the formation of the welded joint; and

Fig. 3 is a view, similar to Fig. 1, illustrating a modified form of closure.

Referring to Figs. 1 and 2 of the drawings, the invention is illustrated as embodied in a generally cylindrical upright pressure vessel 10 having a closure 20 from which it is slightly spaced by a clamping ring 30. While the use of a clamping ring 30 interposed between the vessel and head is specifically illustrated in Figs. 1 and 2 of the drawing, this illustration is solely by way of showing a specific application of the invention principles and not by way of limitation, as the invention is equally applicable to the case where closure 20 is in direct engagement with vessel 10 without the interposition of clamping ring 30 therebetween, as illustrated in Fig. 3.

Vessel 10 comprises a relatively thick main outer body of high tensile strength carbon-silicon steel boiler or pressure vessel plate, such as that designated SA–212. This body is indicated at 11. The interior surface of the pressure vessel has thereon a relatively thinner lining 12 of a stainless steel such as an AISI Type 347 19Cr—9Ni—Cb alloy steel which is substantially non-contaminating and non-contaminable. Similarly, closure head 20 has a relatively thick outer body 21, of the same material as body 11 of vessel 10, and a relatively thinner interior lining 22 of the same material as lining 12.

The inner margin of the upper end of vessel 10 is formed with a relatively narrow flat surface 13 lying in a diametric plane and formed entirely in lining 12. Extending from the outer edge of surface 13 is a frusto-conical surface 14 having a very narrow apex angle, so that surface 14 makes only a small angle with the container axis and this surface also is formed entirely in lining 12. A concave circular transition surface 16 joins frusto-conical surface 14 to an upwardly and outwardly extending frusto-conical surface 15 lying at an angle of about 15° to the horizontal. Surface 15 terminates at a frusto-conical surface 17 extending nearly vertically downwardly and merging with a downwardly and outwardly extending frusto-conical surface 18 which is at an angle of substantially 45° to the horizontal.

In the example specifically illustrated in Figs. 1 and 2, where a ring 30 is interposed between vessel 10 and its closure 20, the inner margin of the rim of head 20 has a frusto-conical surface 23 which is inwardly and downwardly directed to form an angular nose of substantially the radial width of surface 13 of vessel 10. Surface 23, at its outer end, intersects a cylindrical surface 24 of substantial axial length. A frusto-conical surface 26 extends downwardly from the lower end of surface 24, in parallel slightly spaced relation to surface 14 when the vessel and closure head are assembled with clamping ring 30 in position. Another frusto-conical surface 25 extends upwardly and outwardly from surface 26 at an angle of approximately 30° to the horizontal. Head surfaces 23, 24 and 26 are formed entirely in lining 22, and the inner end of surface 25 is also formed in this lining. At its outer end, surface 25 intersects a substantially cylindrical surface 27 which, at its upper end, joins an upwardly and outwardly sloping frusto-conical surface 28 extending at substantially 45° to the horizontal.

In the more general case illustrated in Fig. 3, where closure 20 is assembled to vessel 10 without the interposition of ring 30, the inner margin of the rim of head 20 has a flat surface 23' lying in a diametric plane and formed entirely in lining 12. Surface 23' extends radially inwardly from the upper end of surface 26, and extends outwardly beyond the mating surface 13 of vessel 10 so as to maintain surfaces 14 and 26 in predetermined slightly spaced and parallel relation. Other than this, the form of the welding groove in Fig. 3 is identical with that of Figs. 1 and 2.

It will be noted that surfaces 15 and 25 conjointly form a blunt V-shaped welding groove extending upwardly and outwardly at an angle to the horizontal from its inner end, thus facilitating deposition of welding metal to seal the closure head 20 to vessel 10. The included angle of the welding groove is approximately 15°.

Referring again to the arrangement of Figs. 1 and 2, clamping ring 30 comprises a cylindrical body 31 of rectangular cross-section having cylindrical outer surface portions arranged to engage linings 12 and 22. On its outer surface, ring 30 has a rib 35 projecting therefrom and having a flat lower edge surface 36 lying in a diametric plane to mate with surface 13 of pressure vessel 10. The outer surface 37 of rib 35 is cylindrical and mates with surface 24 of closure head 20. The upper surface 38 of rib 35 is frusto-conical to form an angular, circumferentially extending nose mating with the nose formed on head 20 by frusto-conical surface 23. Clamping ring 30 forms no part of the present invention insofar as its structural details are concerned.

In advance of the welding operation, the head closure 20 is properly positioned on ring 30 seated on vessel 10 in the manner illustrated in Fig. 1, or directly on vessel 20 as illustrated in Fig. 3, with careful measurements being taken of the vertical or axial distances between the flat, facing surfaces of machined pads 19 and 29 on vessel 10 and head 20, respectively. It will be noted that the root or base of the welding groove is formed by stainless steel surfaces 14 and 16 and that the space between surfaces 26 and 14 extends non-radially of the assembly and nearly axially thereof.

Before making the seal weld illustrated in Fig. 2, the welding groove-forming portions of vessel 10 and head 20 are first preheated, for example to from 250° F. to 300° F. at a heating rate such as to avoid undue stresses, for example 20° F. per hour, and the minimum preheating temperature is maintained until the welding is completed. Before utilization in the welding operation, all of the welding electrodes are conditioned by baking at an elevated temperature, such as 400° F. for not less than 2 hours.

In forming the welded joint, an initial bead *a* is first deposited in contact with surfaces 14 and 25, this bead being deposited from a weld rod having substantially the same composition as that of linings 12 and 22. This first weld bead substantially closes the root of the welding groove. A second bead *b* is then deposited in contact with surfaces 14 and 16, and with bead *a*. Next, a bead *c* is deposited in contact with beads *a* and *b* and with surface 25, followed by a bead *d* in contact with beads *b* and *c* and with surface 15. Beads *e* and *f* are then deposited as illustrated in Fig. 2. All of the beads *b*, *d*, *e* and *f* are deposited from extra low carbon, low hydrogen type coating, steel electrodes. The remainder of the welding groove formed by surfaces 15 and 25 is then filled by depositing beads *g*, *h*, *i*, *j*, etc., bead *z* being the last bead deposited. These beads are deposited from high tensile strength, low hydrogen type coating, steel electrodes, having a tensile strength of 70,000 p.s.i.

The welding procedure utilized in depositing these beads is the same as that previously described, with all deposited beads being inspected, chipped and cleaned before depositing successive beads. The stainless steel beads *a* and *c* are thoroughly cleaned of slag and carefully inspected for cracks, porosity, slag pockets, or other defects, which are completely eliminated before proceeding to the next beads. Special care is used in placing beads *b*, *d*, *e* and *f*, adjacent beads *a* and *c*, to minimize pickup of chromium and nickel.

The function of the space between the parallel surfaces 14 and 26 is important. Should a crack develop in the welding beads at the root of the weld, it is of the greatest importance that this crack should not propagate radially of the assembly. With the space between surfaces 14 and 26 extending nearly axially, any crack would tend to propagate along the longitudinal direction of this space. When the weld has been finished, the outer beads are ground or machined to a suitable smooth contour to extend, for example, ⅛ inch outwardly of the outer surface of the assembly.

To remove the seal weld to open the assembly, a machined tool is advanced into the weld downwardly and inwardly toward surface 14. This surface is of such a nature that seal welds may be made and removed several times before there is any appreciable deterioration of surface 14.

While a specific embodiment of the invention has been shown and described in detail to illustrate the application of the invention principle, it will be understood that the invention may be embodied otherwise without departing from such principle.

What is claimed is:

1. In combination an upright cylindrical pressure vessel having an open upper end, said vessel having an interior lining of stainless steel metal; a closure head for said vessel having an interior lining of stainless steel; a lining portion of one of said vessel and head extending longitudinally in overlapping relation with a lining portion of the other of said vessel and head when the head is positioned on the upper end of the vessel; the overlapped surfaces of said lining portions being in spaced parallel relation and forming an annular gap extending outwardly at a small angle to the common axis of said vessel and head; the rim of said head and the upper end of said vessel being shaped to conjointly form an upwardly and radially outwardly extending welding groove, having outwardly diverging walls both of which extend outwardly and upwardly, whose root is formed by said lining portions; said annular gap intersecting the root of said groove; and a seal weld deposit in said welding groove including root weld metal, of substantially the same composition as that of said linings, in engagement with said lining portions and closing the outer end of said gap; the root of said welding groove having a width and contour such as to admit a metal removing tool completely into said groove for machining out said seal weld deposit.

2. The combination claimed in claim 1 including weld metal, deposited from extra low carbon, low hydrogen coating electrodes, overlying said root weld metal.

3. The combination claimed in claim 1 including intermediate weld metal, deposited from extra low carbon, low hydrogen coating electrodes overlying said root weld metal; the balance of said welding groove being filled with weld metal deposited from low hydrogen coating carbon steel electrodes.

4. In combination an upright cylindrical pressure vessel having an open upper end, said vessel having an interior lining of non-contaminating and non-contaminable metal; a closure head for said vessel having an interior lining of non-contaminating and non-contaminable metal; a spacer ring interposed between facing circumferential edge portions of the end of said vessel and the rim of said closure head, said circumferential edge portions being formed in said interior linings; a lining portion of one of said vessel and head engaging the radially outer surface of said ring and extending longitudinally therebeyond in overlapping relation with a lining portion of the other of said vessel and head; the overlapped surfaces of said lining portions being in spaced parallel relation to form an annular gap extending outwardly from said ring at a small angle to the common axis of said vessel and head; the rim of said head and the upper end of said vessel being shaped to conjointly form an upwardly and radially outwardly extending welding groove, having outwardly diverging walls, whose root is formed by said lining portions; and a seal weld deposit in said welding groove including root weld metal, of substantially the same composition as that of said linings, in engagement with said lining portions and closing the outer end of said gap, and intermediate weld metal deposited from extra low carbon, low hydrogen coating electrodes overlying said root weld metal; the balance of said welding groove being filled with weld metal deposited from low hydrogen coating carbon steel electrodes.

5. In combination, an upright cylindrical pressure vessel having an open upper end, said vessel having an interior lining of stainless steel; a closure head for said vessel having an interior lining of stainless steel; the end of said vessel and the rim of said closure head having mating circumferential edge portions formed in said interior linings and engageable when the closure head is positioned on the open end of the vessel; the lining of said vessel being machined to form a frusto-conical surface therein extending downwardly from the upper edge of its mating end portion at a small angle to the vessel axis, and the lining of said head being formed with a frusto-conical surface extending in parallel closely spaced relation to said first mentioned frusto-conical surface; the latter extending downwardly beyond said second mentioned frusto-conical surface; the rim of said head and the upper end of said vessel, outwardly of said frusto-conical surfaces, being shaped to conjointly form an upwardly and radially outwardly extending welding groove, having outwardly diverging walls both of which extend outwardly and upwardly, whose root is formed by the extension of said first mentioned frusto-conical surface; and a seal weld deposit in said welding groove including root weld metal, of substantially the same composition as that of said linings, in engagement with the exposed portions of said linings and closing the outer end of the gap between said frusto-conical surface portions.

6. The combination claimed in claim 5 in which said linings and root weld metal are a 19Cr-9Ni-Cb alloy steel.

7. In combination, an upright cylindrical pressure vessel having an open upper end, said vessel having an interior lining of non-contaminating and non-contaminable stainless steel; a closure head for said vessel having an interior lining of non-contaminating and non-contaminable stainless steel; a cylindrical spacer ring engaging the linings of said vessel and head and having an outwardly projecting rib interposed between facing circumferential edge portions of the end of said vessel and the rim of said closure head, said circumferential edge portions being formed in said interior linings; the lining of said vessel being machined to form a frusto-conical surface therein extending downwardly from the lower outer edge of said rib at a small angle to the vessel axis, and the lining of said head being formed with a cylindrical surface juxtaposed to the outer cylindrical surface of said ring and a frusto-conical surface extending in parallel closely spaced relation to said first mentioned frusto-conical surface; the latter extending downwardly beyond said second mentioned frusto-conical surface; the rim of said head and the upper end of said vessel, outwardly of said frusto-conical surfaces, being shaped to conjointly form an upwardly and radially outwardly extending welding groove, having outwardly diverging walls, whose root is formed by the extension of said first mentioned frusto-conical surface; and a seal weld deposit in said welding groove including root weld metal, of substantially the same composition as that of said linings, in engagement with the exposed portions of said linings and closing the outer end of the gap between said frusto-conical surface portions.

8. The combination claimed in claim 7 in which said linings and root weld metal are a 19Cr—9Ni—Cb alloy steel.

9. The combination claimed in claim 7 in which said first mentioned frusto-conical surface extends sufficiently beyond said second mentioned frusto-conical surface to provide for entry of a metal removing tool to the root of said seal weld deposit to provide for separation of said vessel and head.

10. In combination, an upright cylindrical pressure vessel having an open upper end, said vessel having an interior lining of non-contaminating and non-contaminable stainless steel; a closure head for said vessel having an interior lining of non-contaminating and non-contaminable stainless steel; a cylindrical spacer ring engaging the linings of said vessel and head and having and outwardly projecting rib interposed between facing circumferential edge portions of the end of said vessel and the rim of said closure head, said circumferential edge portions being formed in said interior linings; the lining of said vessel being machined to form a frusto-conical surface therein extending downwardly from the lower outer edge of said rib at a small angle to the vessel axis, and the lining of said head being formed with a cylindrical surface juxtaposed to the outer cylindrical surface of said ring and a frusto-conical surface extending in parallel closely spaced relation to said first mentioned frusto-conical surface; the latter extending downwardly beyond said second mentioned frusto-conical surface; the rim of said head and the upper end of said vessel, outwardly of said frusto-conical surfaces, being shaped to conjointly form an upwardly and radially outwardly extending welding groove, having outwardly diverging walls, whose root is formed by the extension of said first mentioned frusto-conical surface; and a seal weld deposit in said welding groove including root weld metal, of substantially the same composition as that of said linings, in engagement with the exposed portions of said linings and closing the outer end of the gap between said frusto-conical surface portions, and weld metal deposited from extra low carbon, low hydrogen coating electrodes overlying said root weld metal.

11. In combination, an upright cylindrical pressure vessel having an open upper end, said vessel having an interior lining of non-contaminating and non-contaminable stainless steel; a closure head for said vessel having an interior lining of non-contaminating and non-contaminable stainless steel; a cylindrical spacer ring engaging the linings of said vessel and head and having an outwardly projecting rib interposed between facing circumferential edge portions of the end of said vessel and the rim of said closure head, said circumferential edge portions being formed in said interior linings; the lining of said vessel being machined to form a frusto-conical surface therein extending downwardly from the lower outer edge of said rib at a small angle to the vessel axis, and the lining of said head being formed with a cylindrical surface juxtaposed to the outer cylindrical surface of said ring and a frusto-conical surface extending in parallel closely spaced relation to said first mentioned frusto-conical surface; the latter extending downwardly beyond said second mentioned frusto-conical surface; the rim of said head and the upper end of said vessel, outwardly of said frusto-conical surfaces, being shaped to conjointly form and upwardly and radially outwardly extending welding groove, having outwardly diverging walls, whose root is formed by the extension of said first mentioned frusto-conical surface; and a seal weld deposit in said welding groove including root weld metal, of substantially the same composition as that of said linings, in engagement with the exposed portions of said linings and closing the outer end of the gap between said frusto-conical surface portions, and intermediate weld metal deposited from extra low carbon, low hydrogen coating electrodes overlying said root weld metal; the balance of said welding groove being filled with weld metal deposited from low hydrogen coating carbon steel electrodes.

References Cited in the file of this patent

UNITED STATES PATENTS 2,050,326 Hopkins ---------------- Aug. 11, 1936
2,158,799 Larson ----------------- May 16, 1939

FOREIGN PATENTS 402,705 Italy ------------------- Mar. 22, 1943